E. GRUENFELDT.
DEVICE FOR SUSPENDING BATTERY CRADLES.
APPLICATION FILED JAN. 23, 1908.
905,176.
Patented Dec. 1, 1908.
2 SHEETS—SHEET 1.
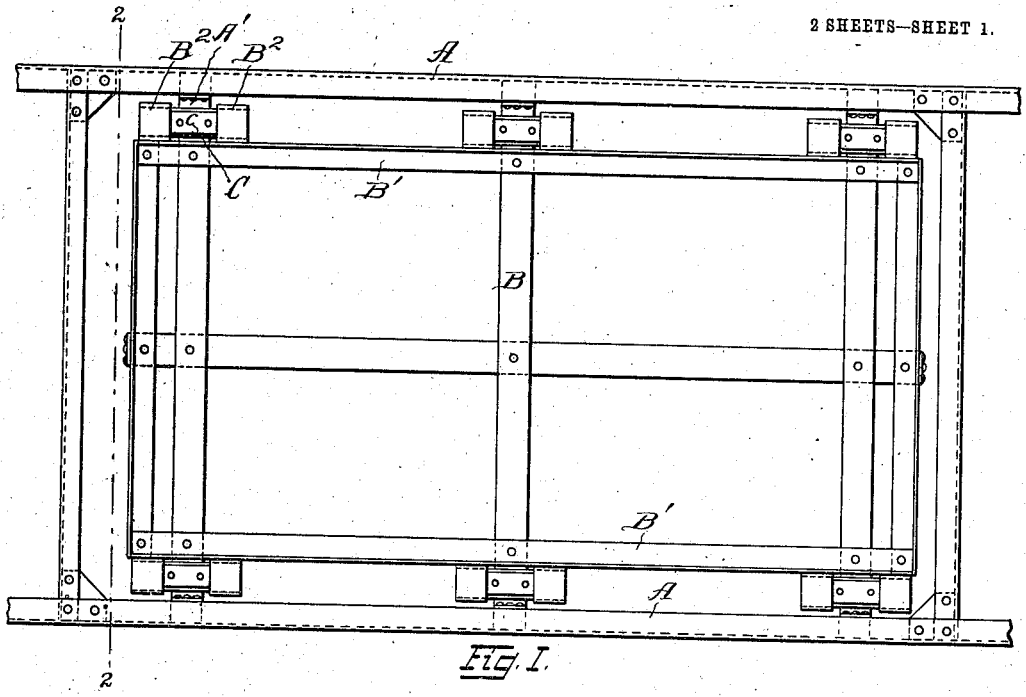
Fig. I.
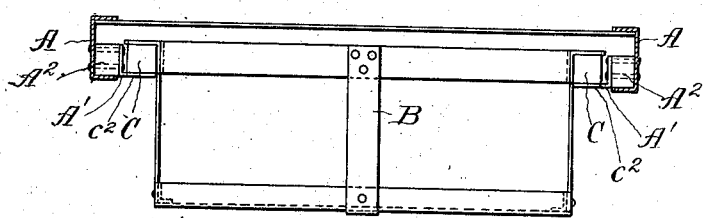
Fig. II.
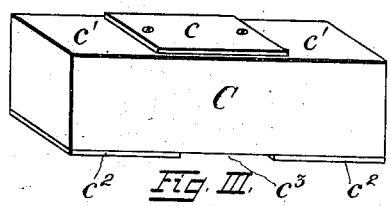
Fig. III.
Witnesses:
F. C. Valentine
Lena A. Dirlam.
Inventor:
Emil Gruenfeldt
by A. E. Merkel
his attorney.

E. GRUENFELDT.
DEVICE FOR SUSPENDING BATTERY CRADLES.
APPLICATION FILED JAN. 23, 1908.
905,176.
Patented Dec. 1, 1908.
2 SHEETS—SHEET 2.
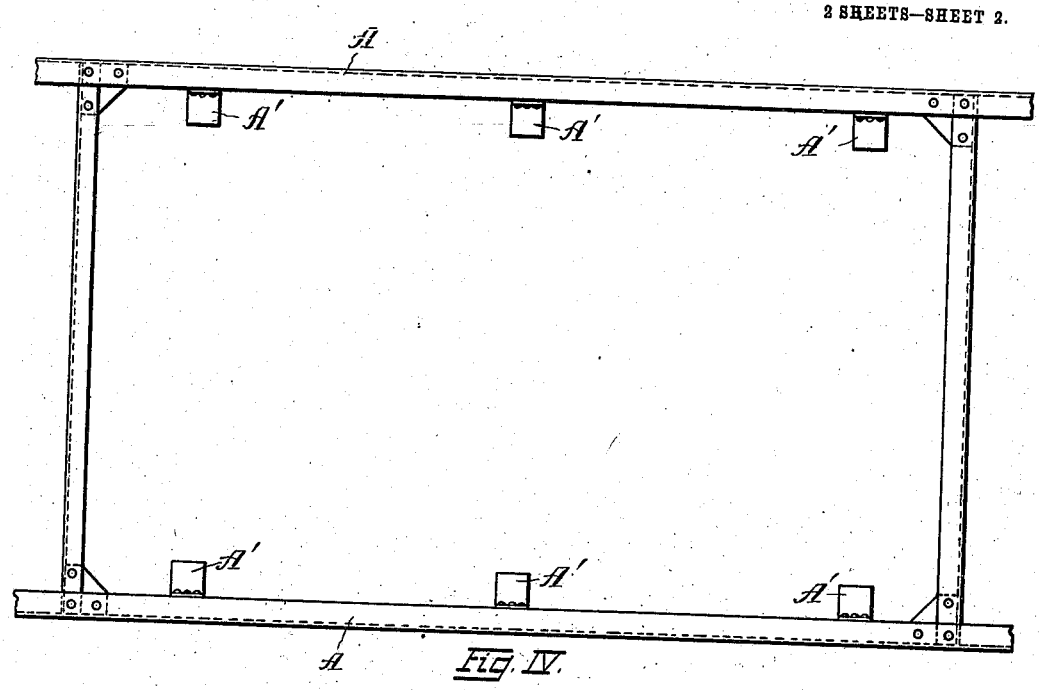
Fig. IV.
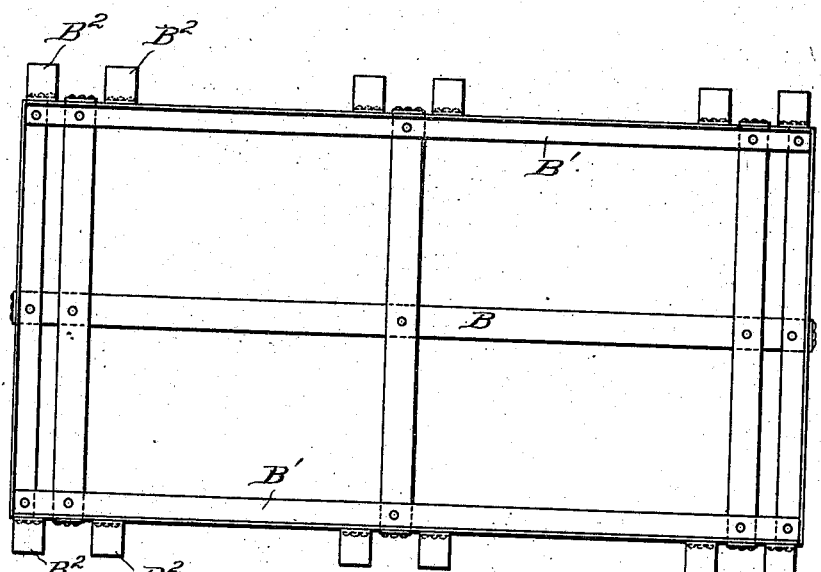
Fig. V.
Witnesses:
F. C. Valentine
Lena A. Dirlam
Inventor:
Emil Gruenfeldt
by A. E. Merkel
his attorney.

UNITED STATES PATENT OFFICE.

EMIL GRUENFELDT, OF CLEVELAND, OHIO, ASSIGNOR TO THE BAKER MOTOR VEHICLE COMPANY, OF CLEVELAND, OHIO, A CORPORATION OF OHIO.

DEVICE FOR SUSPENDING BATTERY-CRADLES.

No. 905,176.      Specification of Letters Patent.      Patented Dec. 1, 1908.

Application filed January 23, 1908. Serial No. 412,233.

*To all whom it may concern:*

Be it known that I, EMIL GRUENFELDT, a subject of the Emperor of Germany, resident of Cleveland, county of Cuyahoga, and State of Ohio, have invented a new and useful Improvement in Devices for Suspending Battery-Cradles, of which the following is a specification, the principle of the invention being herein explained and the best mode in which I have contemplated applying that principle, so as to distinguish it from other inventions.

My invention relates to means for suspending battery holders or cradles from the frames of electric motor vessels, its object being to provide means whereby such holders or cradles may be readily mounted upon such frames and readily dismounted therefrom.

The said invention consists of means hereinafter fully described and particularly set forth in the claims.

The annexed drawings and the following description set forth in detail, certain mechanism embodying the invention, the disclosed means constituting but one of various mechanical forms in which the principle of the invention may be applied.

In said annexed drawings:—Figure I represents a plan of a portion of an electric motor vehicle frame and a battery cradle mounted thereon after the manner of my invention. Fig. II represents a section of the frame taken upon the plane indicated by the line 2—2, Fig. I, and showing the cradle mounted thereon in end elevation. Fig. III represents a perspective view, upon an enlarged scale, of the block which effects the interlocking of the parts, and forming a part of my said invention. Fig. IV represents a plan of a portion of the frame shown in Fig. I, with the cradle removed, and Fig. V represents a plan of the cradle removed from the frame.

Upon the inner side of the side-bars A A of the frame and projecting inwardly therefrom is a series of angles or hangers A' A'. These angles are secured to wooden blocks $A^2 A^2$, Fig. II, which are bolted to the frame as shown. Upon the outer side of the side-bars B' B' of the cradle B and projecting outwardly is secured a series of pairs of hangers $B^2 B^2$. The members of each pair are placed so that the hangers A', when the cradle is in position, may be caused to pass between them, as shown in Fig. I. Placed between each set of hangers $B^2 B^2$ and the corresponding hanger A' of the frame is a holding block C preferably of wood. Upon the middle of the upper face of such block is secured a metal plate $c$ which therefore forms two lateral seats $c'$ $c'$. The length of this plate is made substantially equal to the distance between the hangers $B^2 B^2$ in each set, so that when the block is in position said hangers may rest in the seats $c'$ $c'$. Upon each end of the lower face of the block are secured two metal plates $c^2 c^2$ forming an intermediate seat $c^3$. The distance between these two plates is made such that a hanger A' may be received in the seat $c^3$. One such holding block is provided for each set of hangers A' and $B^2 B^2$ and when the cradle is supported by the frame the said blocks are interposed between the hangers of the respective seats, as illustrated in the drawings above described. When it is desired to dismount the cradle, the latter is raised a distance equal to or slightly greater than the combined thicknesses of the plates $c$ and $c^2$. When this is done the holding blocks C may be slid out in the longitudinal direction of the frame, whereupon the cradle may be lowered to the floor, hangers A' passing between the hangers $B^2$.

Other modes of applying the principle of my invention may be employed, instead of the one explained, and change may be made as regards the mechanism herein disclosed, provided the means covered by any one of the following claims be employed.

I, therefore, particularly point out and distinctly claim as my invention:—

1. In a device of the class described, the combination of a supporting frame, a receptacle or cradle, said frame and cradle provided with a series of sets of hangers; and a plurality of removable locking devices, one such holding device being provided for each such set of hangers.

2. In a device of the class described, the combination of a frame, a receptacle or cradle, means secured to said frame and projecting inwardly and means on said cradle projecting outwardly, and separate removable means for holding such projecting means of both frame and cradle together.

3. In a device of the class described, the combination of a frame, a receptacle or cradle, means secured to said frame and projecting inwardly and means on said cradle projecting outwardly, and separate removable means for holding such projecting means of both frame and cradle together against longitudinal displacement of the cradle relatively to the frame.

4. In a device of the class described, the combination of a supporting frame, a receptacle or cradle, said frame and cradle provided with a series of sets of hangers; and a plurality of removable holding devices operable independently of each other, one such holding device being provided for each such set of hangers.

5. In a device of the class described, the combination of a frame, a receptacle or cradle, means secured to said frame and projecting inwardly and means on said cradle projecting outwardly, and a plurality of separate removable means operable independently of each other for holding such projecting means of both frame and cradle together.

6. In a device of the class described, the combination of a frame, a receptacle or cradle, means secured to said frame and projecting inwardly and means on said cradle projecting outwardly, and a plurality of separate removable means operable independently of each other for holding such projecting means of both frame and cradle together against longitudinal displacement of the cradle relatively to the frame.

7. In a device of the class described, the combination of a frame, a receptacle or cradle, means secured to said frame and projecting inwardly and means on said cradle projecting outwardly, and separate removable means for holding such projecting means of both frame and cradle against longitudinal displacement of the cradle relatively to the frame and allowing upward displacement thereof.

8. In a device of the class described, the combination with two members comprising a frame and a receptacle or cradle, a series of angles formed or secured upon said members, each series consisting of two angles formed or secured upon the one of said two members and one angle formed or secured upon the other; a removable member adapted to be placed between the two angles on the one hand and the one angle upon the other hand.

9. In a device of the class described, the combination with two members comprising a frame and a receptacle or cradle adapted to be placed inside said frame, the one member provided with two projections intersecting the space between it and the other member, the other provided with one projection intersecting such space and at points, when the frame is horizontal, not in the same transverse planes perpendicular to the plane of said frame; of a separate holding device for securing such projections to each other against longitudinal displacement relatively to each other.

10. In a device of the class described, the combination of a vehicle frame, a receptacle or cradle, said frame and cradle provided with a plurality of sets of hangers, and a plurality of removable blocks, one of the latter being provided for each such set of hangers, said blocks adapted to hold the latter against longitudinal displacement and arranged to be removable when the cradle is lifted.

11. In a device of the class described, the combination with a set of hangers secured respectively to a supporting and a supported member, each set consisting of two hangers secured to one such member and one hanger secured to the other, of a block adapted to be interposed between the two hangers on the one hand and the one hanger on the other hand, and provided with means for preventing displacement of said hangers horizontally.

12. In a device of the class described, the combination with a set of hangers secured respectively to a supporting and a supported member, each set consisting of two hangers secured to one such member and one hanger secured to the other, of a block provided upon one side with a projecting portion forming two seats and upon the other side with two projections forming an intermediate seat, the two hangers adapted to rest in said two seats and the one hanger adapted to rest in said one seat.

Signed by me, this 21st day of January, 1908.

EMIL GRUENFELDT.

Attested by—
  WM. ROTHENBERG,
  LENA A. DIRLAM.